(12) United States Patent
dos Santos et al.

(10) Patent No.: US 9,815,627 B2
(45) Date of Patent: Nov. 14, 2017

(54) HIGH-ANGLE CONVEYOR SYSTEM

(71) Applicants: Marcus Joseph dos Santos, Marietta, GA (US); Joseph Anibal dos Santos, Marietta, GA (US)

(72) Inventors: Marcus Joseph dos Santos, Marietta, GA (US); Joseph Anibal dos Santos, Marietta, GA (US)

(73) Assignee: Dos Santos International, LLC, Marietta, GA (US)

( * ) Notice: Subject to any disclaimer, the term of this patent is extended or adjusted under 35 U.S.C. 154(b) by 0 days.

(21) Appl. No.: 15/291,259

(22) Filed: Oct. 12, 2016

(65) Prior Publication Data
US 2017/0174433 A1    Jun. 22, 2017

Related U.S. Application Data

(60) Provisional application No. 62/269,001, filed on Dec. 17, 2015.

(51) Int. Cl.
| B65G 15/16 | (2006.01) |
| B65G 15/18 | (2006.01) |
| B65G 15/00 | (2006.01) |
| B65G 23/14 | (2006.01) |
| B65G 39/12 | (2006.01) |

(52) U.S. Cl.
CPC ............. *B65G 15/18* (2013.01); *B65G 15/16* (2013.01); *B65G 23/14* (2013.01); *B65G 39/12* (2013.01)

(58) Field of Classification Search
None
See application file for complete search history.

(56) References Cited

U.S. PATENT DOCUMENTS

| 4,406,359 A | * | 9/1983 | Cole | ................... B65G 21/2036 |
| | | | | 198/626.1 |
| 5,996,769 A | * | 12/1999 | Winchip | ................. B02C 21/02 |
| | | | | 198/607 |

* cited by examiner

*Primary Examiner* — Kavel Singh
(74) *Attorney, Agent, or Firm* — Dunlap Bennett & Ludwig PLLC

(57) ABSTRACT

A high-angle conveyor system is provided. The high-angle conveyor system includes a primary conventional conveyor, a lower high-angle conveyor and an upper high-angle conveyor. The lower high-angle conveyor is disposed within the primary conveyor. Therefore, a portion of the primary conveyor is sandwiched in between the lower high-angle conveyor and the upper high-angle conveyor. Both of the lower high-angle conveyor and the upper high-angle conveyor are disposed at a high angle. Material is transported along the primary conveyor and then transported at a high angle in between the lower high-angle conveyor, the primary conveyor, and the upper high-angle conveyor.

9 Claims, 4 Drawing Sheets

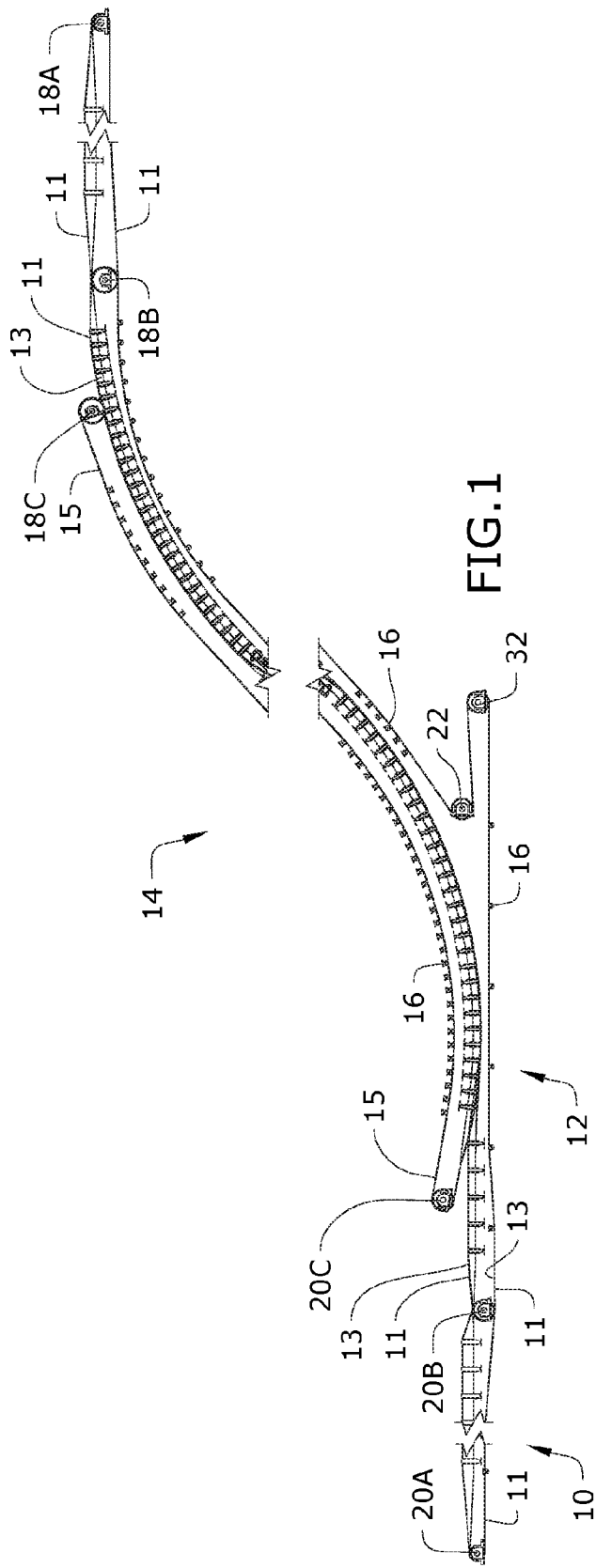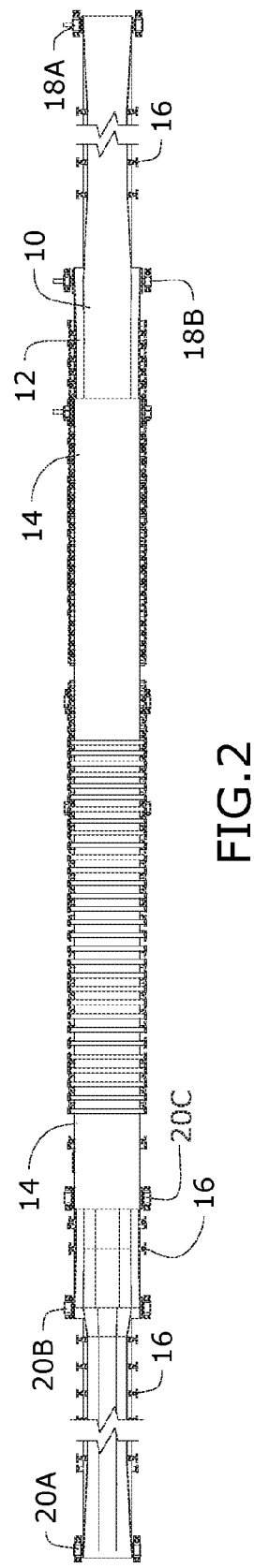

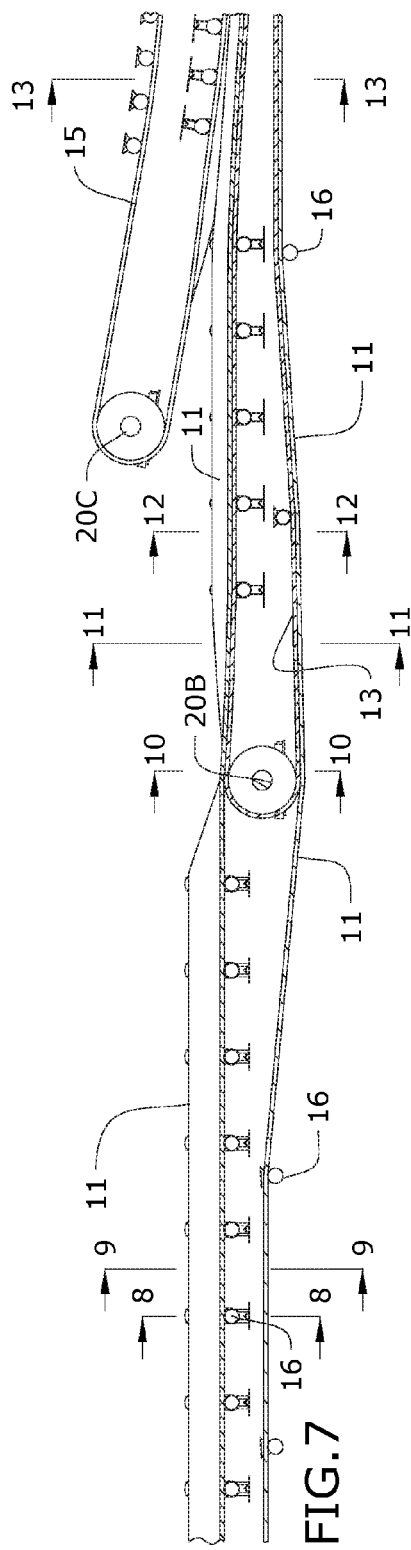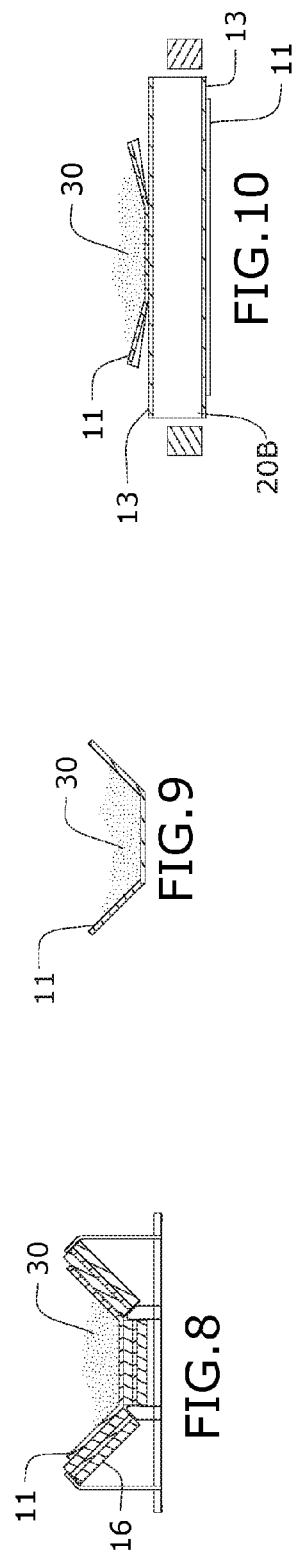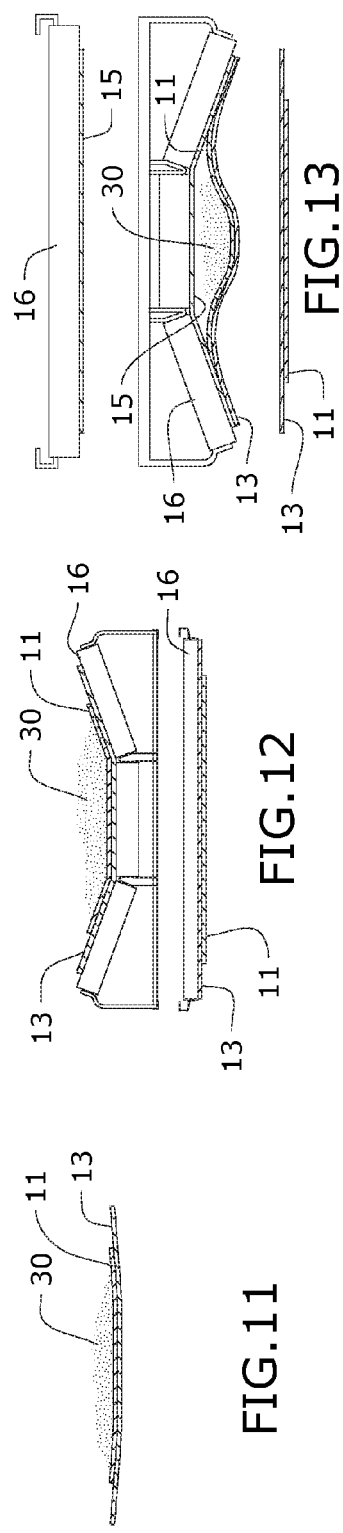

… (continued)

HIGH-ANGLE CONVEYOR SYSTEM

CROSS-REFERENCE TO RELATED APPLICATION

This application claims the benefit of priority of U.S. provisional application No. 62/269,001, filed Dec. 17, 2015, the contents of which are herein incorporated by reference.

BACKGROUND OF THE INVENTION

The present invention relates to conveyors and, more particularly, to a high-angle conveyor system.

Sandwich belt high angle conveyors require a wider belt to carry the same capacity of material as a conventional conveyor at the same speed. When a long, low-angle approach is necessary before the high angle portion of the conveyor, and/or a long, low-angle discharge portion is necessary after the high angle portion of the conveyor, a transfer is required between the conventional conveyor and the high angle sandwich belt conveyor, or the wider bottom belt of the high angle conveyor must be extended. Transfers require additional equipment including a transfer chute, drive equipment and, in some cases, dust suppression. Transfer points also require lifting of the material which adds to the power draw, and dropping of the material onto the receiving belt, which can cause dusting and material degradation.

As can be seen, there is a need for an alternate means of conveying material at high angles in sections of otherwise low-angle conveyor systems.

SUMMARY OF THE INVENTION

In one aspect of the present invention, a high-angle conveyor system comprises: a primary conveyor comprising a primary conventional belt comprising a carrying portion and a return portion rotating about a primary tail pulley and a primary head pulley, wherein the carrying portion of the primary belt comprises a first portion substantially horizontal, a second portion disposed substantially at an angle and a third portion substantially horizontal; a lower high-angle conveyor disposed within the primary conveyor and comprising a lower high-angle belt comprising a carrying portion and a return portion rotating about a lower tail pulley disposed near where the first portion and the second portion meet and a lower head pulley disposed near where the second portion and the third portion meet, wherein the carrying portion of the lower high-angle belt is substantially disposed at an angle; and an upper high-angle conveyor disposed above the primary conveyor and the lower high-angle conveyor and comprising an upper high-angle belt comprising a carrying portion and a return portion rotating about an upper tail pulley disposed near where the first portion and the second portion meet and an upper head pulley disposed near where the second portion and the third portion meet, wherein the carrying portion of the upper high-angle belt is substantially disposed at an angle, wherein the second portion of the primary belt is sandwiched in between the carrying portions of the lower high-angle belt and the upper high-angle belt.

These and other features, aspects and advantages of the present invention will become better understood with reference to the following drawings, description and claims.

BRIEF DESCRIPTION OF THE DRAWINGS

FIG. 1 is a side view of an embodiment of the present invention;

FIG. 2 is a top view of an embodiment of the present invention;

FIG. 7 is a section detail view of the present invention taken along line 7-7 in FIG. 5;

FIG. 8 is a section detail view of the present invention taken along line 8-8 in FIG. 7;

FIG. 9 is a section detail view of the present invention taken along line 9-9 in FIG. 7;

FIG. 10 is a section detail view of the present invention taken along line 10-10 in FIG. 7;

FIG. 11 is a section detail view of the present invention taken along line 11-11 in FIG. 7;

FIG. 12 is a section detail view of the present invention taken along line 12-12 in FIG. 7; and FIG. 13 is a section detail view of the present invention taken along line 13-13 in FIG. 7.

DETAILED DESCRIPTION OF THE INVENTION

Figure 3:
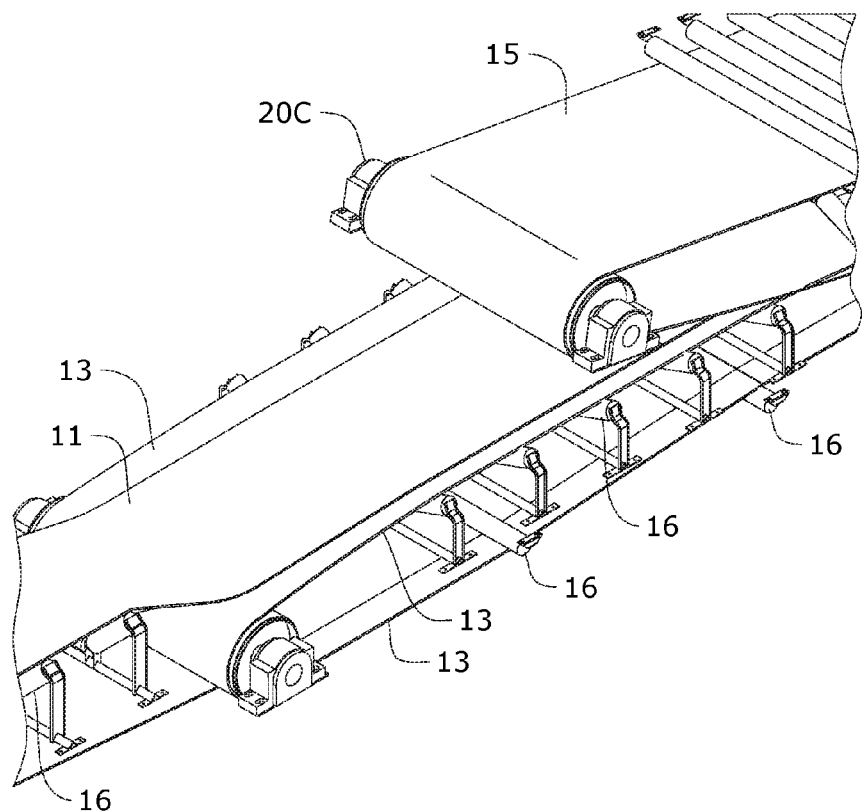
FIG. 3 is a detail perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a high angle bulk material conveyor using a narrow third belt for gathering material along its approach and/or discharging that material beyond the elevating or lowering high angle section. Using the present invention, transfer conveyors are not needed. The narrower low-angle belt of the present invention works directly with the wider high-angle belts with no transfers needed. The present invention uses smooth surfaced, standard conveyor belts that may be scraped clean at the discharge.

In certain embodiments, the present invention includes a long low angle approach before the high angle portion. A primary conveyor belt travels on conveyor idlers as in a conventional conveyor arrangement, up to the point of joining with the sandwich belt high angle conveyor. A high angle lower belt and high angle upper belt travel on conveyor idlers as in a typical sandwich belt high angle conveyor arrangement. At the beginning of the sandwich the primary conveyor belt continues on top of the high angle lower belt and enters the sandwich under the high angle upper belt. The primary conveyor belt then continues through the sandwich belt path, in between the high angle lower belt and high angle upper belt.

At the discharge, if no low-angle portion is needed beyond the head pulleys that serve the high angle lower belt and high angle upper belt, the primary conveyor belt and the high angle lower belt wrap around the lower belt head pulley and the high angle upper belt wraps around the upper belt head pulley. Conveyor drives are attached to each head pulley to drive the conveyor belts. The present invention can also serve to "boost" or "brake" the primary conveyor belt, thereby reducing its tension. In the case of a low-angle discharge extending beyond the head pulleys that serve the high angle lower belt and high angle upper belt, the primary belt extends beyond the lower belt head pulley before returning to its tail pulley.

Belt cleaners at the area of the head pulleys clean the surfaces of the primary conveyor belt, the high angle lower belt and high angle upper belt to ensure discharge of the material from all three belts. The primary conveyor belt continues to follow the path of the high angle lower belt through the takeup pulley, which is actuated by a take-up mechanism (typically hydraulic or gravity), to maintain the proper tension in the belt. The primary conveyor belt then continues to follow the high angle lower belt until the high angle lower belt wraps around the lower belt tail pulley. The primary conveyor belt continues to the primary tail pulley. Bend pulleys can appear along the length of the conveyor to change the direction of the belt as necessary. The high angle upper belt returns to its tail pulley as is typical for a sandwich belt high angle conveyor.

Figure 4:
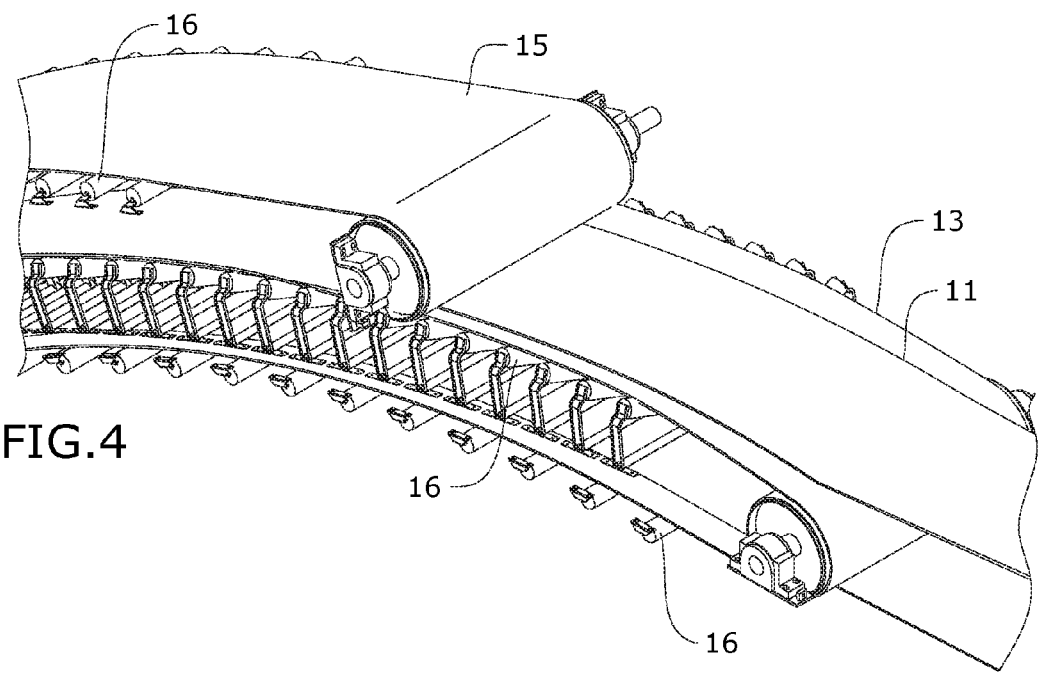
FIG. 4 is a detail perspective view of an embodiment of the present invention.
Figure 5:
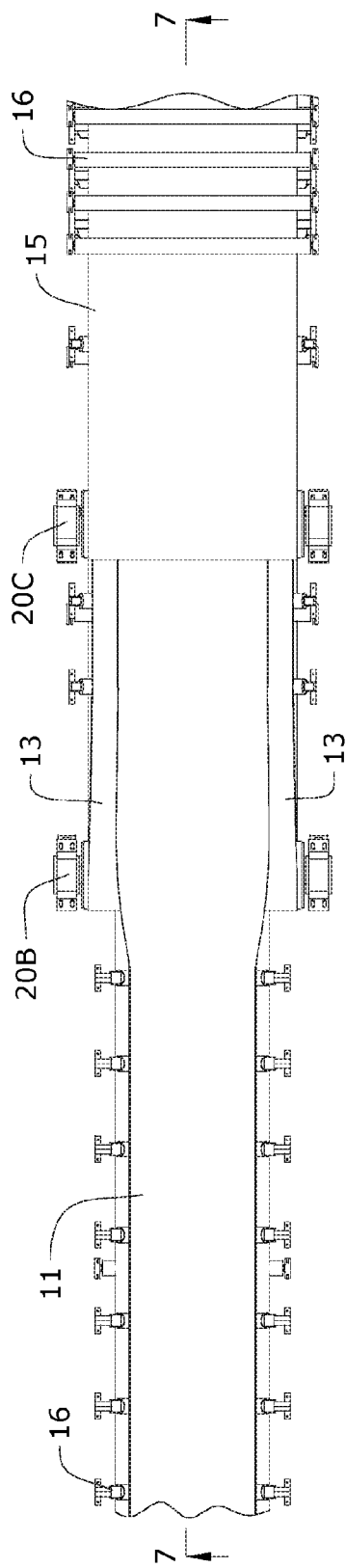
FIG. 5 is a detail top view of an embodiment of the present invention.
Figure 6:
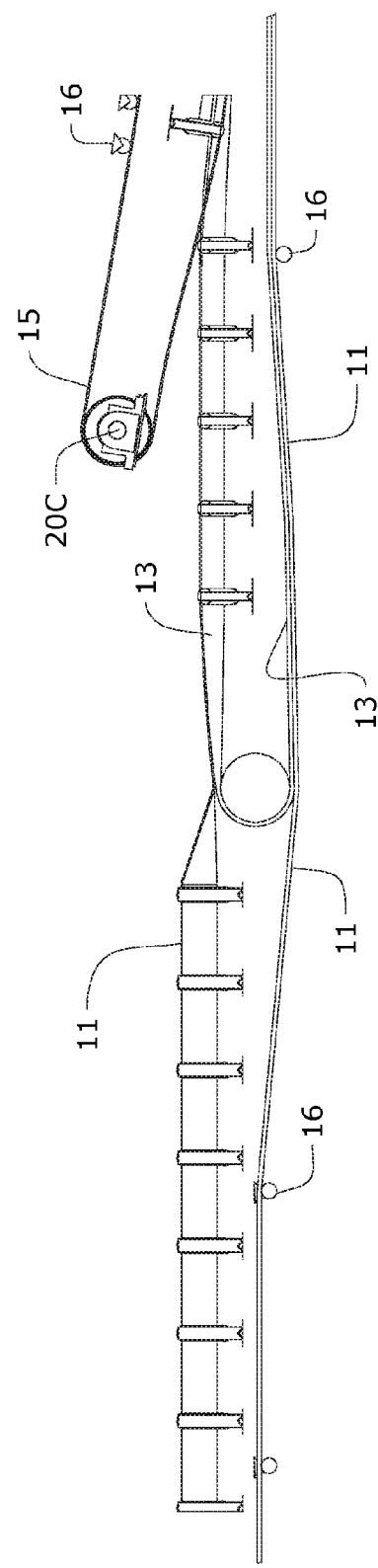
FIG. 6 is a detail side view of an embodiment of the present invention.

Referring to FIGS. 1 through 13, the present invention includes a high-angle conveyor system. The high-angle conveyor system includes a primary conveyor 10, a lower high-angle conveyor 12 and an upper high-angle conveyor 14. The lower high-angle conveyor 12 is disposed within the primary conveyor 10. A portion of the primary conveyor 10 is sandwiched in between the lower high-angle conveyor 12 and the upper high-angle conveyor 14. Both of the lower high-angle conveyor 12 and the upper high-angle conveyor 14 are disposed at a high angle of about 15 degrees up to about 90 degrees. Material 30 is transported along the primary conveyor 10 and then transported at a high angle in between the lower high-angle conveyor 12, the primary conveyor 10 and the upper high-angle conveyor 14.

The primary conveyor 10 includes a primary belt 11 having a carrying portion and a return portion. The primary belt 11 rotates about a primary tail pulley 20a and a primary head pulley 18a. Conveyor drives rotate the pulley 18a and thereby rotate the primary belt 11. The carrying portion of the primary belt 11 can include a first portion substantially horizontal, a second portion disposed substantially at a high angle and a third portion substantially horizontal. A plurality of idlers 16 guide the primary belt 11. The plurality of idlers 16 dispose edges of the carrying portion of the primary belt 11 at an angle forming a trough therebetween.

The lower high-angle conveyor 12 includes a lower high-angle belt 13 having a carrying portion and a return portion. The lower high-angle belt 13 rotates about a lower tail pulley 20b disposed near where the first portion and the second portion meet and a lower head pulley 18b disposed near where the second portion and the third portion meet. In certain embodiments, the lower high-angle belt 13 and the primary belt 11 share the same head pulley 18a, 18b. Alternatively, each of the lower high-angle belt 13 and the primary belt 11 may utilize separate head pulleys 18a, 18b. In certain embodiments, the lower high-angle belt 13 and the primary belt 11 share the same tail pulley 20a, 20b. Alternatively, each may utilize separate tail pulleys 20a, 20b. Conveyor drives rotate the pulley 18b and thereby rotate the lower high-angle belt 13. The carrying portion of the lower high-angle belt 13 is substantially disposed at the high angle. The lower high-angle belt 13 may have a greater width than the primary belt 11. A plurality of idlers 16 guide the lower high-angle belt 13. The plurality of idlers 16 dispose edges of the carrying portion of the lower high-angle belt 13 at an angle forming a trough therebetween. The return portion of the primary belt 11 and the lower high-angle belt 13 may travel about a bend pulley 22 and a take-up pulley 32. The take up pulley 32 may move forward and backward to maintain tension within the primary belt 11 and the lower high-angle belt 13.

The upper high-angle conveyor 14 is disposed above the primary conveyor 10 and the lower high-angle conveyor 12. The upper high-angle conveyor 14 includes an upper high-angle belt 15 having a carrying portion and a return portion. The upper high-angle belt 15 rotates about an upper tail pulley 20c disposed near where the first portion and the second portion meet and an upper head pulley 18c disposed near where the second portion and the third portion meet. The upper tail pulley 20c may also serve as a take up pulley and move backwards and forwards to maintain correct tension of the upper high-angle belt 15. The carrying portion of the upper high-angle belt 15 is substantially disposed at a high angle. The second portion of the primary belt 11 is sandwiched in between the carrying portions of the lower high-angle belt 13 and the upper high-angle belt 15. The lower high-angle belt 13 is typically substantially the same width as the upper high-angle belt 15. A plurality of idlers 16 guide the upper high-angle belt 15. The plurality of idlers 16 dispose edges of the carrying portion of the upper high-angle belt 15 at an angle forming a trough therebetween.

In certain embodiments, the plurality of idlers 16 of the upper high-angle belt 15 and the lower high-angle belt 13 form an S-shape having a first curve and a second curve. A first set of idlers 16 form the first curve, guide the carrying portion of the upper high-angle belt 15 and a second set of idlers 16 form the second curve and guide the carrying portion of the lower high-angle belt 13.

The high-angle section of the present invention may be extended indefinitely by adding additional curves or by adding straight high angle portions with pressure-inducing mechanisms to apply a hugging force to the belts and material.

In an application in which a long loading area is necessary, or in which the loading area is far from the destination, but the path to the destination cannot be elevated or lowered until very near the destination, the present invention allows a high angle path to be achieved without a transfer. Similarly, if a high angle is necessary only at the beginning of the conveyor, the present invention allows the narrow, primary belt to extend indefinitely beyond the sandwich conveyor portion, again, without a transfer. Further, the high angle portion can be positioned at any point along the conventional path, with no transfers.

It should be understood, of course, that the foregoing relates to exemplary embodiments of the invention and that modifications may be made without departing from the spirit and scope of the invention as set forth in the following claims.

What is claimed is:

1. A high-angle conveyor system comprising:
    a primary conveyor comprising a primary belt comprising a carrying portion and a return portion rotating about a primary tail pulley and a primary head pulley, wherein the carrying portion of the primary belt comprises a first portion substantially horizontal, a second portion disposed substantially at an angle and a third portion substantially horizontal;
    a lower high-angle conveyor disposed within the primary conveyor and comprising a lower high-angle belt comprising a carrying portion and a return portion rotating about a lower tail pulley disposed near where the first portion and the second portion meet and a lower head pulley disposed near where the second portion and the third portion meet, wherein the carrying portion of the lower angle belt is substantially disposed at an angle; and an upper high-angle conveyor disposed above the primary conveyor and the lower high-angle conveyor and comprising an upper high-angle belt comprising a carrying portion and a return portion rotating about an upper tail pulley disposed near where the first portion and the second portion meet and an upper head pulley disposed near where the second portion and the third portion meet, wherein the carrying portion of the upper high-angle belt is substantially disposed at an angle, wherein the second portion of the primary belt is sandwiched in between the carrying portions of the lower high-angle belt and the upper high-angle belt.

2. The high-angle conveyor system of claim 1, wherein the lower high-angle belt comprises a greater width than the primary belt.

3. The high-angle conveyor system of claim 2, wherein the lower high-angle belt comprises substantially the same width as the upper high-angle belt.

4. The high-angle conveyor system of claim 1, wherein each of the primary conveyor, the lower high-angle conveyor and the upper high-angle conveyor comprise a plurality of idlers guiding their respective belts, wherein the plurality of idlers dispose edges of the carrying portions of the belts at an angle forming a trough therebetween.

5. The high-angle conveyor system of claim 4, wherein the plurality of idlers of the upper high-angle belt and the lower high-angle belt form an S-shape comprising a first curve and a second curve.

6. The high angle conveyor system of claim 4, wherein the plurality of idlers of the upper high-angle belt and the lower high-angle belt extend the carrying profile indefinitely by forming multiple curves or by forming straight portions which employ pressure-inducing mechanisms to apply hugging force to the belts and material.

7. The high-angle conveyor system of claim 4, wherein a first set of idlers form the first curve and guide the carrying portion of the upper and lower high-angle belt and primary belt and a second set of idlers form the second curve and guide the carrying portion of the upper and lower high-angle belt and primary belt.

8. The high-angle conveyor system of claim 1, wherein the return portion of the primary belt and the lower high-angle belt travel about a bend pulley and a take-up pulley.

9. The high-angle conveyor system of claim 1, wherein primary belt and the lower high-angle belt share the same head pulley.

* * * * *